Feb. 25, 1930.   R. P. DUNMIRE   1,748,546
CONDUIT BOX
Filed Dec. 19, 1925

INVENTOR.
Russell P. Dunmire
BY
ATTORNEYS.

Patented Feb. 25, 1930

1,748,546

UNITED STATES PATENT OFFICE

RUSSELL P. DUNMIRE, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT BOX

Application filed December 19, 1925. Serial No. 76,487.

This invention is designed to improve conduit fittings, particularly conduit fittings adapted for use in connection with threadless conduits. Features and details of the invention will appear from the specification and claim.

The invention is illustrated in the accompanying drawings as follows:—

Figure 1:
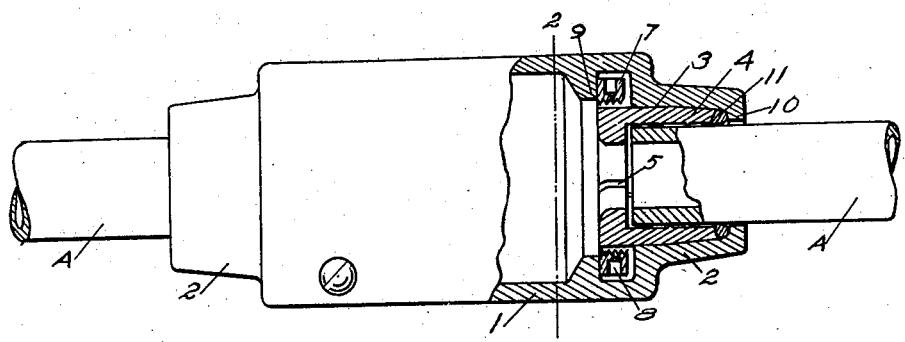
Figure 2:
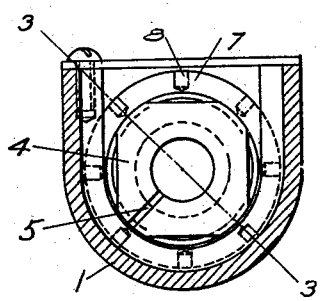
Figure 3:
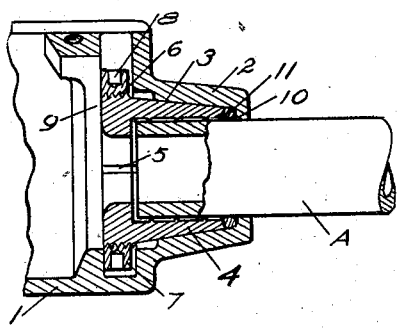

Fig. 1 shows a top view, partly in section.
Fig. 2 a section on the line 2—2 in Fig. 1.
Fig. 3 a section on the line 3—3 in Fig. 2.

1 marks the body of the box, 2 a conduit receiving projection having a tapered opening therein, and 4 a tapered contractible sleeve operating in the tapered opening, this tapered sleeve having a slit 5. The inner end of the sleeve has screw threads 6 and a nut 7 is screwed on these screw threads. The nut, as shown, has radial openings 8 for affording a wrench-hold for the nut.

Shoulders 9 are formed on the walls of the body, the opening within the shoulders being sufficient for the insertion of the sleeve 4.

The nut is dropped into the space between the shoulder 9 and the end of the box and the sleeve is screwed into the nut into place. A conduit A is then placed in the sleeve, screwing the nut seating the same against the shoulder 9, the sleeve is forced into the opening 3 and into clamping engagement with the conduit. The outer end of the extension has a flange 10 with a packing 11 on the end of the sleeve.

What I claim as new is:—

In a conduit box, the combination of a body having a conduit opening and a shoulder in the box spaced from the inner end of the opening; a slotted contractible sleeve in the opening, said sleeve and the walls of the opening having wedging engaging surfaces contracting the sleeve upon a relative endwise movement of the sleeve and body, the inner end of the sleeve being the larger; and a nut on the inner end of the sleeve in the space between the shoulder and the wall of the body at the end of the sleeve, said nut seating on the shoulder and through its thrust forcing the sleeve into the opening.

In testimony whereof I have hereunto set my hand.

RUSSELL P. DUNMIRE.